(12) United States Patent
Monden et al.

(10) Patent No.: US 9,772,811 B2
(45) Date of Patent: Sep. 26, 2017

(54) IMAGE PROCESSING SYSTEM, IMAGE PROCESSING APPARATUS, AND IMAGE PROCESSING METHOD

(71) Applicant: CANON KABUSHIKI KAISHA, Tokyo (JP)

(72) Inventors: Kazuhiro Monden, Inagi (JP); Hideyuki Watanabe, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/287,646

(22) Filed: May 27, 2014

(65) Prior Publication Data
US 2014/0354611 A1 Dec. 4, 2014

(30) Foreign Application Priority Data

May 30, 2013 (JP) ................. 2013-114508

(51) Int. Cl.
*G06F 3/14* (2006.01)
*H04N 21/41* (2011.01)
*H04N 21/436* (2011.01)
*H04N 21/4402* (2011.01)

(52) U.S. Cl.
CPC ....... *G06F 3/1423* (2013.01); *H04N 21/4122* (2013.01); *H04N 21/43615* (2013.01); *H04N 21/440245* (2013.01)

(58) Field of Classification Search
CPC .......... G09G 3/20; G06F 13/00; G06F 3/153; H04N 21/23; H04N 21/440245; H04L 67/325
See application file for complete search history.

(56) References Cited

U.S. PATENT DOCUMENTS

| 2007/0088780 A1* | 4/2007 | Sato | ................. H04L 61/2015 709/204 |
|---|---|---|---|
| 2010/0011285 A1* | 1/2010 | Kawata | ................. G06F 3/0481 715/246 |
| 2010/0045567 A1* | 2/2010 | Lin | ................. G06F 3/1454 345/1.1 |
| 2013/0163812 A1* | 6/2013 | Mukasa | ................. G06T 9/00 382/103 |

FOREIGN PATENT DOCUMENTS

| CN | 1656458 A | 8/2005 |
|---|---|---|
| CN | 101625619 A | 1/2010 |
| JP | 2004-177784 A | 6/2004 |

* cited by examiner

*Primary Examiner* — Sahlu Okebato
(74) *Attorney, Agent, or Firm* — Canon U.S.A., Inc. IP Division

(57) ABSTRACT

In an image processing apparatus, display on a display device connected to the image processing apparatus is controlled. A change in an image to be displayed on the display device is detected. If a change in the image to be displayed has been detected, controlling to transmit not an entire area of the image to be displayed but a partial area including a changed area in image to be displayed. If a method of transmitting an image to a projection apparatus is a first communication method where a reception response is not made to the transmission of the image, controlling to transmit the partial area and to periodically transmit the entire area.

18 Claims, 8 Drawing Sheets

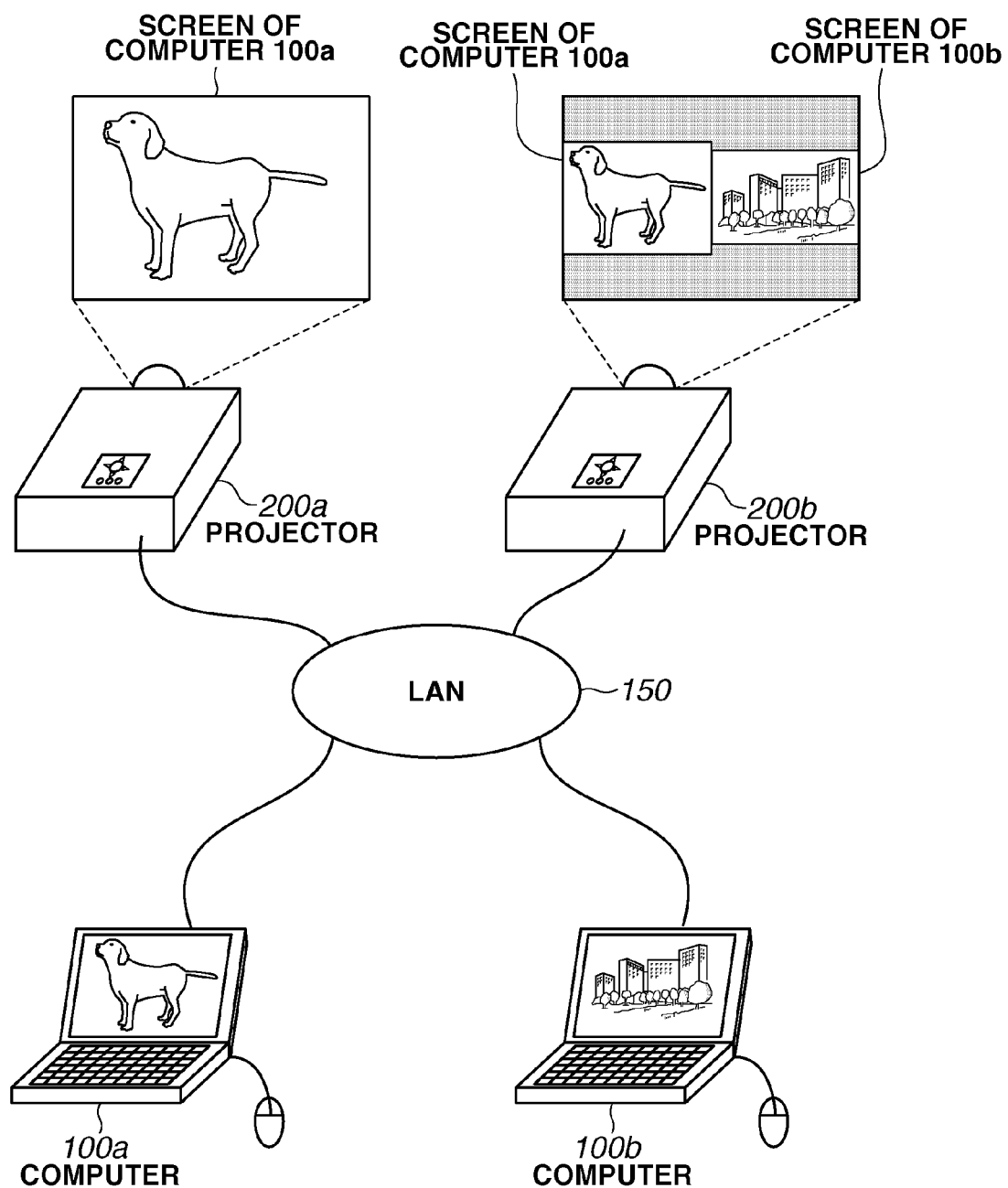

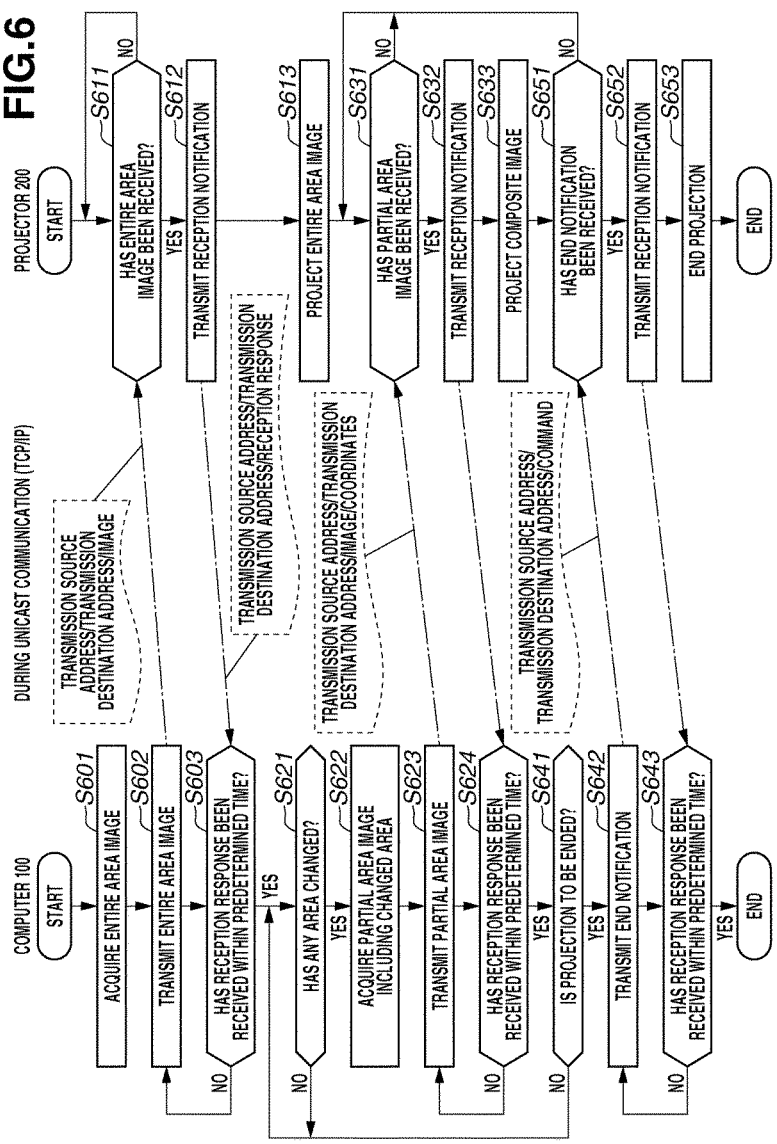

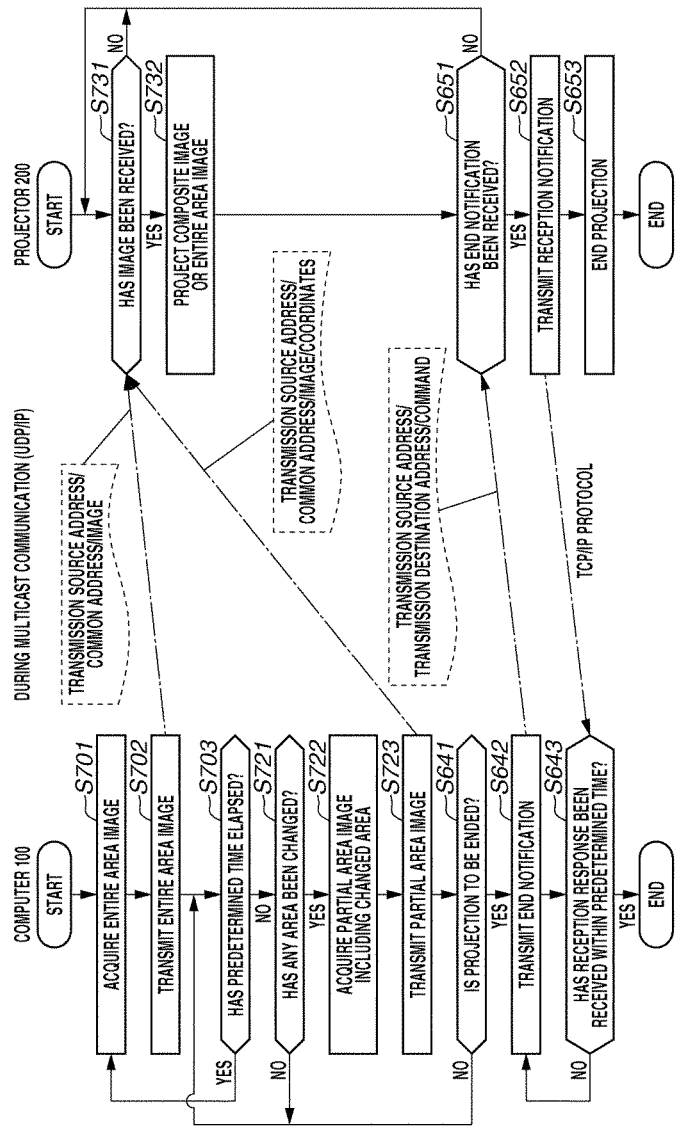

IMAGE PROCESSING SYSTEM, IMAGE PROCESSING APPARATUS, AND IMAGE PROCESSING METHOD

BACKGROUND OF THE INVENTION

Field of the Invention

The present application generally relates to image processing and, more particularly, to a technique for processing an image and transmitting the image to an external apparatus.

Description of the Related Art

Conventionally, a so-called computer is known as an image processing apparatus. For example, a laptop computer can transmit a signal of a display screen of the laptop computer to a different display apparatus such as an external monitor or projector through a video output terminal, and cause the different display apparatus to display the display screen. For example, the publication of Japanese Patent Application Laid-Open No. 2004-177784 discusses a technique for connecting to an external monitor or projector via a network, capturing a display screen of a laptop computer, transmitting the captured display screen as image data to the external monitor or projector to which the laptop computer is connected, and causing the external monitor or projector to display the received image data.

SUMMARY OF THE INVENTION

According to at least an aspect of the present disclosure, an image processing apparatus capable of communicating with a projection apparatus includes: a display control unit configured to control display on a display device connected to the image processing apparatus; a detection unit configured to detect a change in an image to be displayed on the display device; and a transmission control unit configured to, if the detection unit has detected a change in the image to be displayed, contralto transmit not an entire area of the image data to be displayed but a partial area including a changed area in the image data to be displayed, wherein if a method of transmitting an image to the projection apparatus is a first communication method where a reception response is not made to a transmission of the image, the transmission control unit controls to transmit the partial area to periodically transmit the entire area.

Further features of the present disclosure will become apparent from the following description of exemplary embodiments with reference to the attached drawings.

BRIEF DESCRIPTION OF THE DRAWINGS

FIG. 3 is a conceptual diagram of a network screen transfer system.

FIG. 6 is a processing flow chart illustrating the computer and the projector performing unicast communication.

FIG. 7 is a processing flow chart illustrating the computer and the projector performing multicast communication.

DESCRIPTION OF THE EMBODIMENTS

Figure 1:
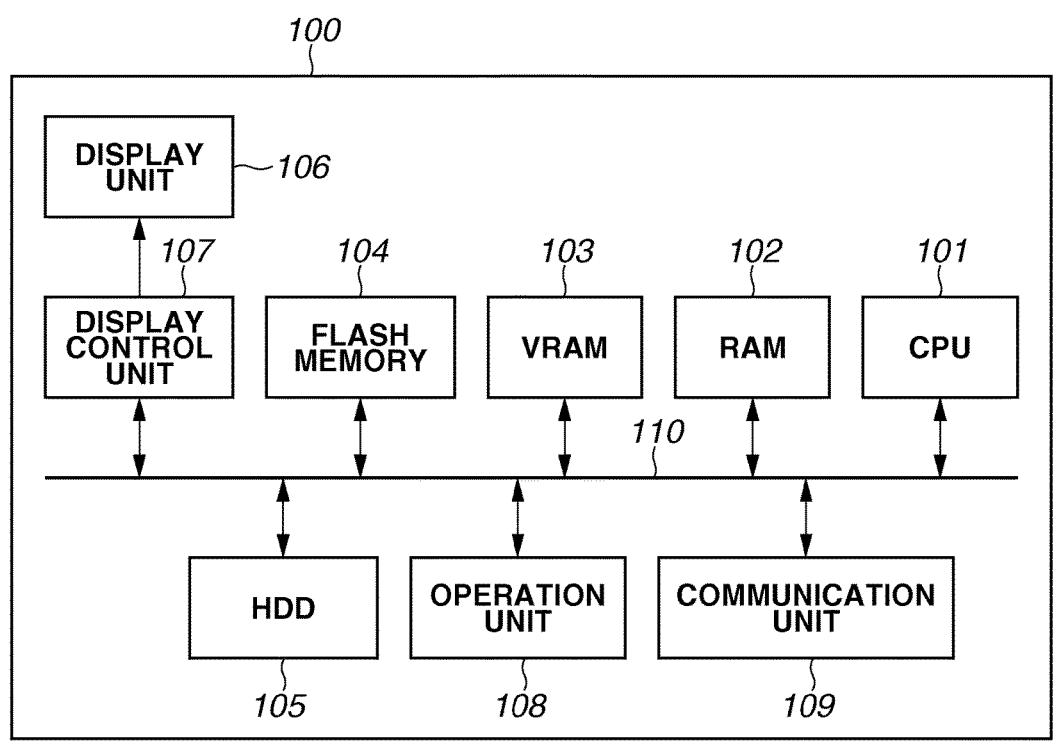
FIG. 1 is a hardware configuration of a computer.

Various exemplary embodiments, features, and aspects of the disclosure will be described in detail below with reference to the drawings.

The disclosure is not limited to the following exemplary embodiments. The following exemplary embodiments do not limit the disclosure according to the appended claims, and not all the combinations of the features described in the exemplary embodiments are essential for a method for solving the problems in the disclosure.

Each functional block described in the following exemplary embodiment does not necessarily need to be an individual piece of hardware. That is, for example, the functions of some functional blocks may be performed by a single piece of hardware. Further, the function of a single functional block or the functions of a plurality of functional blocks may be performed by the cooperation of some pieces of hardware. Further, the function of each functional block may be performed by a computer program loaded into a memory by a central processing unit (CPU).

A first exemplary embodiment is described. In the present exemplary embodiment, an image processing apparatus is described using a computer as an example, and an image processing system is described using a system including a projector and a computer as an example. The image processing apparatus, however, may be any apparatus if it can process and transmit an image similar to the computer described below. Further, a display apparatus in the image processing system may be any apparatus if it can receive an image and display the image on a display unit similar to the projector described below. For example, the image processing apparatus may be a mobile phone, a tablet computer, a hard disk recorder, or a digital camera. Further, the display apparatus may be a display, a television, a mobile phone, or a tablet computer.

The image processing system according to the present exemplary embodiment includes a computer and a projector. The computer acquires an image of its display screen and transmits the acquired image to the projector via a network. Meanwhile, the projector displays the received image on a display unit. That is, the projector projects a screen that corresponds to and is the same as a screen displayed on the computer.

On the network, the computer and the projector can communicate with each other using at least the User Datagram Protocol/Internet Protocol (UDP/IP) and the Transmission Control Protocol/Internet Protocol (TCP/IP) as communication protocols. The computer has a first mode where the computer transmits an image to the projector by unicast communication using TCP/IP as a communication protocol, and a second mode where the computer transmits an image to the projector by multicast communication using UDP/IP as a communication protocol. Even when transmitting images to a plurality of projectors, the computer can transmit different images to the plurality of projectors, using unicast communication. On the other hand, the computer can transmit the same image to a plurality of projectors by transmitting the image to the plurality of projectors once, using multicast communication. Each communication method thus has an advantage, and therefore, the computer according to the present exemplary embodiment has an image transmission method including these two types of communication methods. Additionally, the computer may transmit an image by broadcast communication.

Then, when transmitting an image by unicast communication (the computer is in the first mode), the computer captures an image of, in the entire area of an image to be displayed by the projector, a partial area (an area smaller than the entire area) including an area which has undergone image change, and transmits the captured image to the projector together with the coordinates of the captured image. When, on the other hand, transmitting an image by multicast communication (the computer is in the second mode), the computer periodically (e.g., every 3 seconds/4 seconds/5 seconds) captures an image of the entire area of an image to be displayed by the projector, and transmits the captured image. Further, if the image to be displayed by the projector has undergone change during the intervals while capturing an image of the entire area, the computer captures an image of, in the entire area of the image to be displayed by the projector, a partial area (an area smaller than the entire area) including the changed area, and transmits the captured image to the projector together with the coordinates of the captured image. That is, when performing multicast communication, the computer captures at predetermined timing (intervals) an image of the entire area of an image to be displayed by the projector, and transmits the captured image. At timing other than the predetermined timing, the computer captures an image of, in the entire area of the image to be displayed by the projector, a partial area including a changed area, and transmits the captured image.

If an image of the entire area has been received, the projector displays an image corresponding to the image of the entire area, and temporarily stores the image of the entire area in a buffer area. Further, if an image of a partial area and information of the coordinates of the image have been received, the projector generates an image by superimposing the received image of the partial area on the image temporarily stored in the buffer area, at a corresponding coordinate position, and displays the generated image.

With such a configuration, the image processing system and the image processing apparatus according to the present exemplary embodiment can reduce the possibility of giving discomfort to the user.

The image processing system including such a computer and such a projector is described below.

First, with reference to FIGS. 1 and 2, the main components of a computer 100 and a projector 200 included in the image processing system according to the present exemplary embodiment are described below.

First, the main components of the computer 100 are described. A CPU 101 controls the components of the computer 100 according to an input signal and a program, thereby performing overall control of the computer 100, such as display control, recording control, image processing control, and communication control. A random-access memory (RAM) 102 is a main memory for storing data. The RAM 102 is used mainly as storage areas for various types of data, such as an area for storing or loading a program to be executed by the CPU 101, and a work area used during the execution of the program. A video random-access memory (VRAM) 103 is used as an area for storing an image to be displayed on a display unit 106. If the speed of the RAM 102 is sufficiently high, the RAM 102 may be used as the VRAM 103. A flash memory 104 stores a boot program to be executed by the CPU 101 at initialization. In executing the boot program, an operating system (OS) recorded in a hard disk drive (HDD) 105 into the RAM 102 is loaded to start the OS. The hard disk drive (HDD) 105 is used to store various programs such as an application program and the OS, and store data. As used herein, the term "unit" generally refers to any combination of software, firmware, hardware, or other component that is used to effectuate a purpose.

The display unit 106 displays an image designated by a display control unit 107. The display unit 106 is, for example, a liquid crystal panel or an organic electroluminescence (EL) panel. The display control unit 107 performs the process of reading an image stored in the VRAM 103, and displaying the image on the display unit 106. An operation unit 108 receives an input from the user. The operation unit 108 includes, for example, a keyboard, a mouse, and a touch panel. An input operation performed through each of these devices is transmitted to the CPU 101. If a touch panel is employed, the touch panel can be integrated with the display unit 106 so that the user can input an operation by performing a touch operation on a display surface. A communication unit 109 communicates with an external device, particularly the projector 200, via a communication network 150. The communication unit 109 includes, for example, an interface such as one gigabit Ethernet (registered trademark) interface and a wireless local area network (LAN), but is not limited to these. An internal bus 110 connects the above processing blocks to one another. The computer 100 does not necessarily need to be controlled by a single piece of hardware. Alternatively, the units of the computer 100 may be achieved by, for example, a plurality of pieces of hardware sharing processing.

Figure 2:
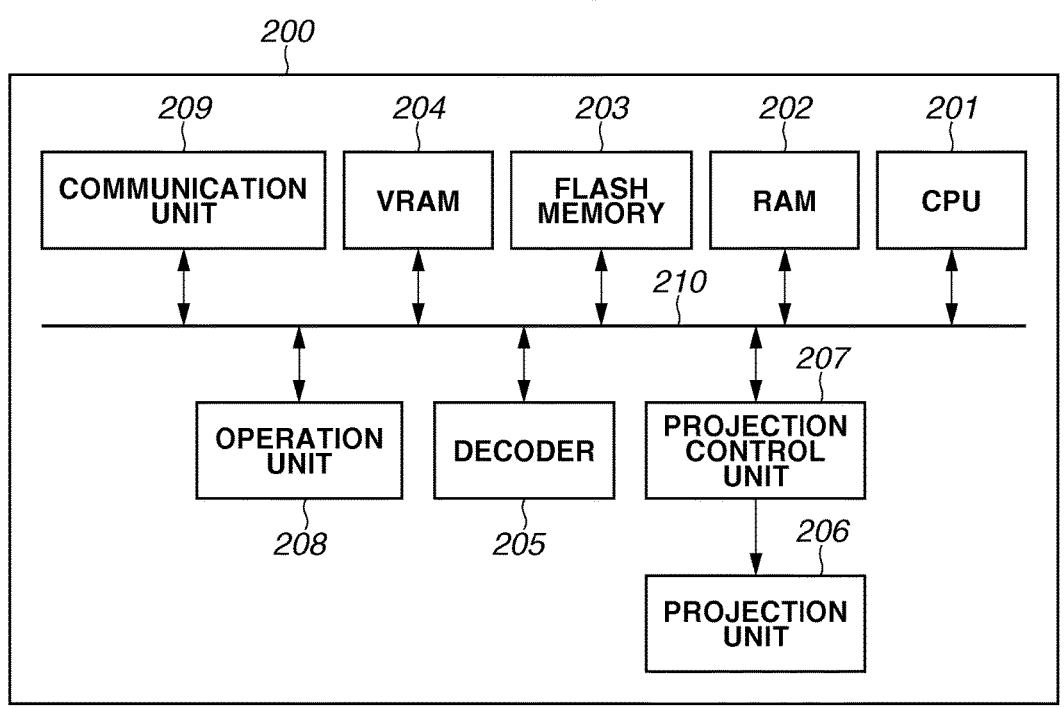
FIG. 2 is a hardware configuration of a projector.

Next, with reference to FIG. 2, the main components of the projector 200 are described. The hardware functions of a CPU 201, a RAM 202, a flash memory 203, a VRAM 204, an operation unit 208, a communication unit 209, and an internal bus 210 are similar to those of the computer 100, and therefore are not described here. A decoder 205 decodes encoded image data such as image data compressed in the Joint Photographic Experts Group (JPEG) format, for example. A projection unit 206 includes a liquid crystal panel, a lens, and a light source and projects an image designated by a projection control unit 207. The projection control unit 207 reads an image stored in the VRAM 204, and controls the projection unit 206 to project the image. The CPU 201 may operate as the projection control unit 207. The projector 200 does not necessarily need to be controlled only by the above hardware. Alternatively, the units of the computer 100 may be achieved by, for example, a plurality of pieces of hardware that shares processing.

The image processing system according to the present exemplary embodiment including the computer 100 and the projector 200 is described.

FIG. 3 is a diagram illustrating the outline of the image processing system according to the present exemplary embodiment.

The purpose of the image processing system is for the projector 200 to project a screen displayed on the computer 100. The computer 100 captures a screen displayed on the display unit 106, and generates compressed image data in the JPEG format, for example. Then, the computer 100 transmits the compressed image data to the projector 200. Meanwhile, the projector 200, having received the compressed image data, decodes the compressed image data and projects the decoded image data. This operation is performed, for example, at regular intervals, whereby the projector 200 projects the screen of the computer 100.

The image processing system according to the present exemplary embodiment can include a plurality of computers and a plurality of projectors. In the example of FIG. 3, two computers 100a and 100b and two projectors 200a and 200b communicate with one another via the LAN 150. The image processing system may include one or more computers and one or more projectors. The numbers of computers and projectors manageable by each computer and each projector, or the numbers of computers and projectors manageable by the network are the maximum numbers of connectable computers and projectors.

In the image processing system according to the present exemplary embodiment, as illustrated in FIG. 3, the projector 200a can project an image displayed on the computer 100a. The projector 200a can also project an image displayed on the computer 100b. Further, as illustrated in FIG. 3, it is also possible to project images in a multi-screen layout such that, for example, the projector 200b projects the images displayed on the computers 100a and 100b in a dual screen layout. When display is performed in a multi-screen layout, the storage locations for the decoding results of pieces of video data received from a plurality of computers are set to addresses of the VRAM 204 taking into account the display positions of the images displayed on the respective computers. When display is performed in a multi-screen layout, each computer may perform a resizing process on video data before encoding the video data.

In the image processing system according to the present exemplary embodiment, through a graphical user interface (GUI) provided by a program on the computer 100, the user of the computer 100 gives various instructions such as the selection of a projector with which the computer 100 is to communicate, the settings of the display form, e.g., the display layout when projection is performed, and the start and stop of screen transfer.

The operation of the image processing system according to the present exemplary embodiment is described. The image processing system according to the present exemplary embodiment can manage session information of a session including one or more image transmission apparatuses and one or more image display apparatuses even if image transmission apparatuses do not communicate with each other or image display apparatuses do not communicate with each other. In the present exemplary embodiment, the session information is an example of group information. In the image processing system according to the present exemplary embodiment, it is possible to perform communication using at least TCP/IP and UDP/IP as communication protocols.

Figure 4A:
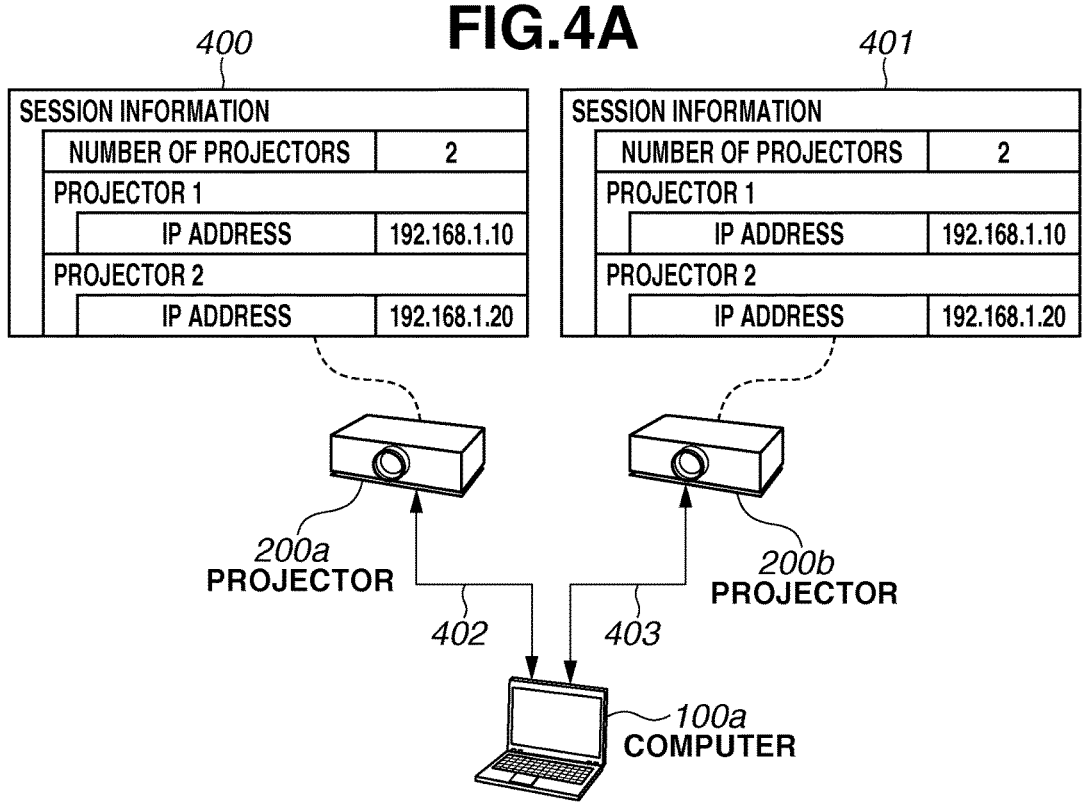
FIGS. 4A, 4B, and 4C are conceptual diagrams of session states.
Figure 4B:
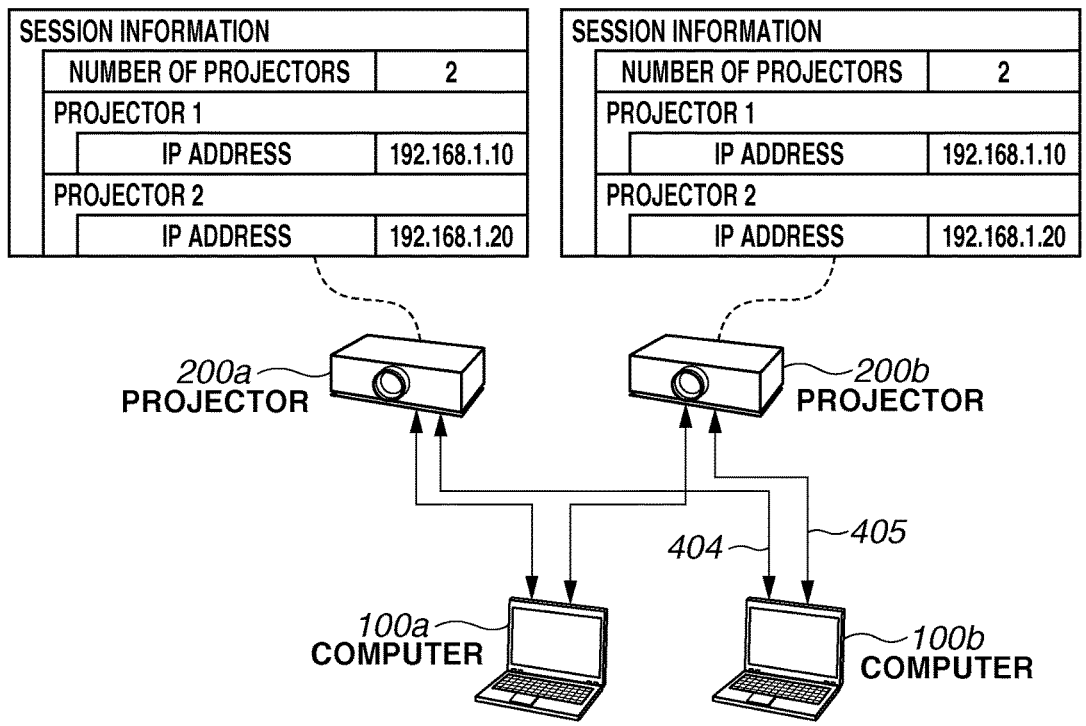
Figure 4C:
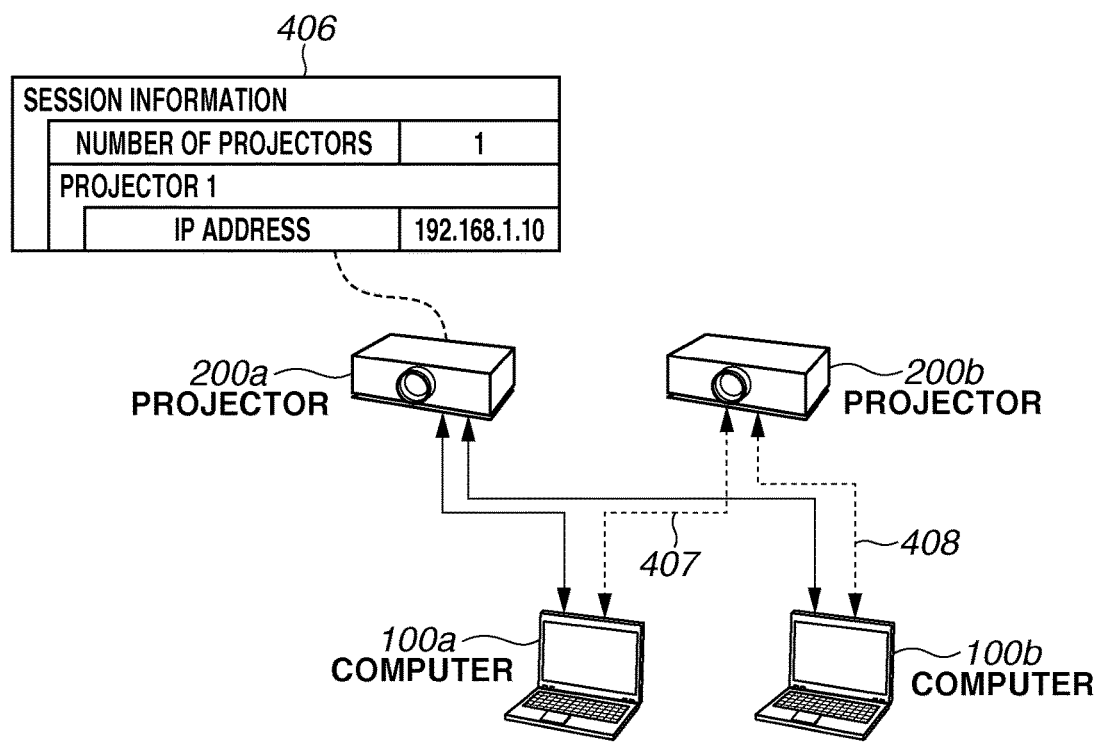
Figure 5:
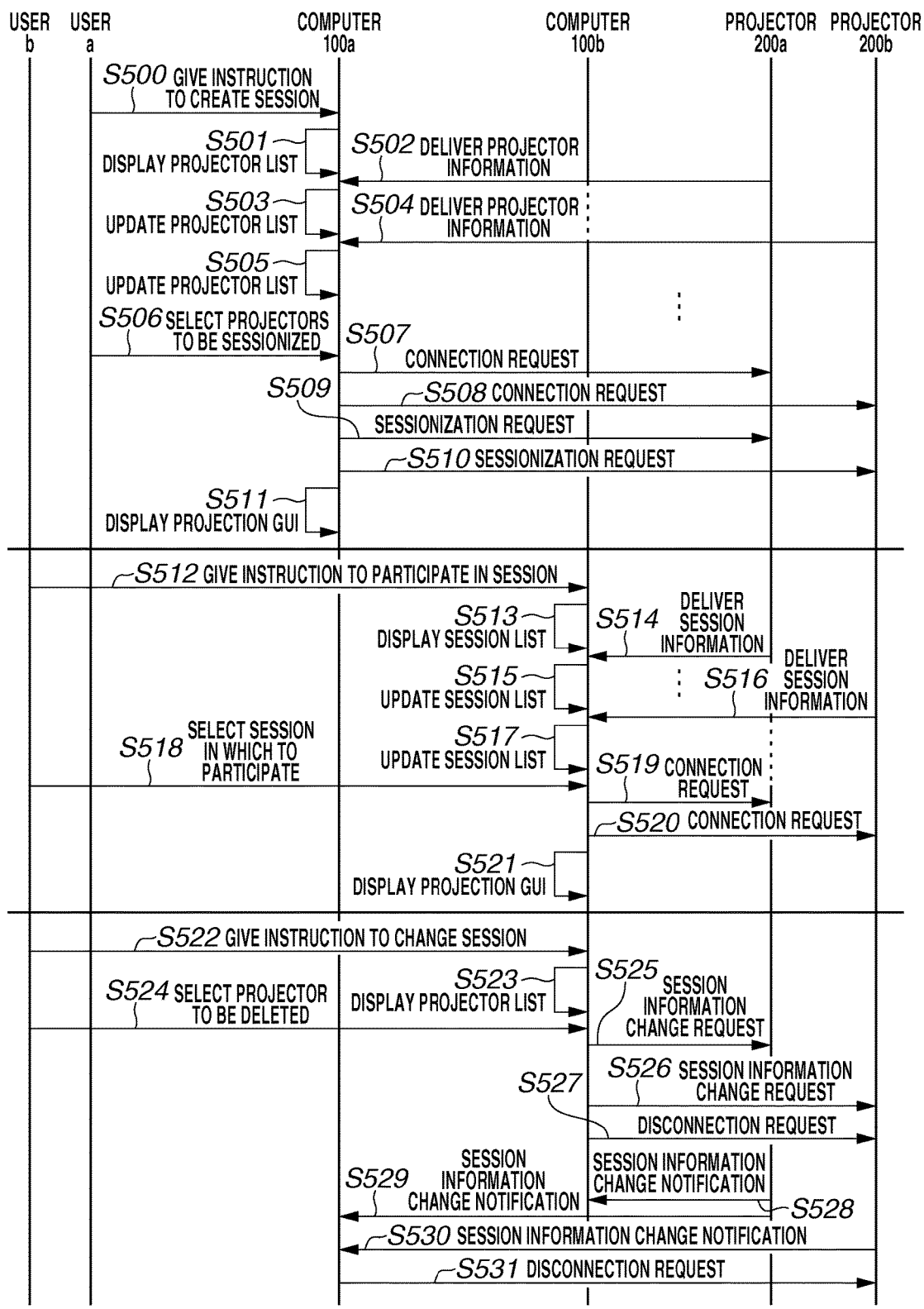
FIG. 5 is a communication flow chart illustrating the communication between computers and projectors.

First, with reference to conceptual diagrams of session states in FIGS. 4A, 4B and 4C and a communication flow chart in FIG. 5, a typical sequence of managing session information is described.

First, a description is given of the flow where the computer 100a creates a session including the projectors 200a and 200b as illustrated in FIG. 4A. If the creation of the session has been successful, then as illustrated in FIG. 4A, a communication channel 402 is established between the computer 100a, which is the creator of the session, and the projector 200a. Also a communication channel 403 is established between the computer 100a and the projector 200b. Further, the computer 100a shares session information with each projector, whereby session information 400 held by the projector 200a and session information 401 held by the projector 200b become the same session information. As the session information, the number of projectors (two in this case) belonging to the session and information (the IP address in this case) of each projector belonging to the session are shared. The computer 100a thus creates a network group termed a session including the projectors 200a and 200b.

With reference to FIG. 5, a description is given below of a specific communication sequence where a user a operates the computer 100a to create a session including the projectors 200a and 200b.

In step S500, the user a operates a GUI application on the computer 100a to instruct the computer 100a to create a new session.

In step S501, the GUI application displays a projector list for selecting projectors to be included in the session. This projector list is formed based on a projector information command broadcast from each projector onto the network.

In the present exemplary embodiment, the projectors 200a and 200b are present on the network. Thus, in steps S502 and S504, each projector broadcasts a projector information command onto the network. The projector information command includes, for example, at least the IP address of the projector. Although the projector information command is transmitted at this timing for ease of description, the projector before being sessionized thus delivers the projector information command including the information of the projector every certain time period. This delivery process is an example of the transmission of a second transmission unit.

In steps S503 and S505, the computer 100a, having received the projector information command, updates the projector list. Specifically, the projector list displays the information of each of the projectors 200a and 200b as a projector selectable when the session is created.

In step S506, the user a selects the projectors 200a and 200b from the projector list displayed in the GUI application, and instructs the computer 100a to create the session.

In steps S507 and S508, the GUI application establishes a logical connection between each of the projectors 200a and 200b, which are the projectors to be included in the session to be created, and the GUI application (the computer 100a). The computer 100a and the projectors 200a and 200b, between which the connections have been established at this time, will become able to perform the process of transferring a screen to one another when the projectors 200a and 200b have been sessionized. Each connection may be configured to require the authentication of the password set for the projector.

Then, in steps S509 and S510, the computer 100a transmits a sessionization request command to each of the projectors 200a and 200b, with which the computer 100a has established the connections. The sessionization request command includes the name of the session, the number of projectors to be included in the session, and information regarding the projectors to be included in the session. The sessionization requests transmitted in steps S509 and S510 store the same information described here. Each projector having received the sessionization request command transitions to an already-sessionized state.

Then, in step S511, the computer 100a displays a projection GUI for controlling the projection of the sessionized projectors 200a and 200b.

By the above process, the session creation process has been completed. That is, a communication channel has been established between each of the projectors 200a and 200b and the computer 100a. Further, the sessionization request command including the same information has been transmitted to each projector, and therefore, the projectors 200a and 200b hold common session information.

Next, a description is given of the flow where the computer 100b participates in an already created session (a session created by the computer 100a and including the projectors 200a and 200b) as illustrated in FIG. 4B. If the participation in the session has been successful, then as illustrated in FIG. 4B, communication channels (404, 405) are established between the projectors 200a and 200b included in the already created session and the computer 100b having newly participated in the session.

With reference to FIG. 5, a description is given of a communication sequence where a user b operates the computer 100b to participate in an already created session including the projectors 200a and 200b.

In step S512, the user b operates a GUI application on the computer 100b to instruct the computer 100b to participate in a session.

In step S513, the GUI application displays a session list for selecting a session in which the computer 100b can participate. This session list is formed based on a session information command broadcast from each sessionized projector via the network.

In the present exemplary embodiment, as described above in the flow of the creation of a session, the projectors 200a and 200b are sessionized as projectors belonging to the same session. Thus, in steps S514 and S516, each projector broadcasts a session information command. This transmission process is an example of the transmission of a first transmission unit. The session information command is formed based on the sessionization request command transmitted from the computer 100a creating the session in steps S509 and S510 described above. The session information command includes the name of the session, the number of projectors included in the session, and the information regarding the projectors included in the session. Although the session information command is transmitted at this timing for ease of description, the sessionized projector thus delivers the session information command every certain time period.

In steps S515 and S517, the computer 100b, having received the session information command, updates the session list. Specifically, the session list displays information (e.g., the session name) regarding the session created by the user a, as a session in which the computer 100b can participate. The pieces of information of the session and the projectors belonging to the session that are included in the session information commands transmitted from the projectors 200a and 200b in steps S514 and S516 match each other. Thus, in fact, the list of sessions displayed in the session list does not change at the time of step S517.

In step S518, the user b selects a session (the session created by the computer 100a in this case) in which the computer 100b is to participate, from the session list displayed in the GUI application. Then, the user b instructs the computer 100b to participate in the session.

In steps S519 and S520, the GUI application establishes a logical connection between each of the projectors 200a and 200b, which are the projectors included in the session in which the computer 100b is to participate, and the GUI application (the computer 100b). As described in steps S507 and S508, the computer 100b and the projectors 200a and 200b, between which the connections have been established, become able to perform the process of transferring a screen to one another. The process where each projector receives a connection request from the computer 100b is an example of a second reception process.

Then, in step S521, the computer 100b displays a projection GUI for controlling the projection of the sessionized projectors 200a and 200b.

Next, a description is given of the flow where the computer 100b changes the session configuration to delete the projector 200b from a session as illustrated in FIG. 4C. If the deletion of the projector 200b from the session has been successful, then as illustrated in FIG. 4C, the session information is deleted from the projector 200b previously included in the session. Then, the session information of the single remaining projector 200a included in the session is changed to session information 406. Further, communication channels (407, 408) between the computers 100a and 100b and the projector 200b are disconnected.

With reference to FIG. 5, a description is given of a communication sequence where the user b operates the computer 100b to delete the projector 200b from a session including the projectors 200a and 200b.

In step S522, the user b operates the GUI application on the computer 100b to instruct the computer 100b to change the configuration of projectors belonging to the session.

In step S523, the GUI application displays a projector list for adding a new projector to the session to which the GUI application is currently connected, or for deleting a projector included in the session. Similarly to step S501, this projector list is formed based on the projector information command broadcast via the network from each projector before being sessionized, and the information of each projector with which the GUI application currently has an established connection.

In step S524, the user b selects as a projector to be deleted the projector 200b, to which the computer 100b is currently connected, from the projector list displayed in the GUI application. Then, the user b instructs the computer 100b to delete the projector 200b from the session.

In steps S525 and S526, the GUI application on the computer 100b transmits a session information change request command to each of the projectors 200a and 200b included in the session. The session information change request command is similar in configuration to the sessionization request command in steps S509 and S510 described above. In this case, the number of projectors belonging to the session is one, and the information regarding the projectors belonging to the session is only the information of the projector 200a.

Then, in step S527, the GUI application on the computer 100b disconnects the communication channel with the projector 200b to be deleted from the session.

In steps S528 and S529, the projector 200a notifies the computers to which the projector 200a is currently connected that the session information held by the projector 200a has been changed by the session information change request command received in step S525. At this time, the computers 100a and 100b are currently connected to the projector 200a, and therefore, the projector 200a delivers a session information change notification command to each of the computers 100a and 100b.

Then, also in step S530, similarly to the projector 200a as described above, the projector 200b notifies the computers to which the projector 200b is currently connected that the session information held by the projector 200b has been changed by the session information change request command received in step S526. At this time, the communication channel with the computer 100b has already been disconnected based on the disconnection request from the computer 100b in step S527, and therefore, the session information change notification is to be transmitted only to the computer 100a. The process of issuing a session information change notification command, however, is performed in parallel by different projectors according to the session information change request command. Thus, the sequence may not necessarily be as described here. That is, the process of issuing a session information change notification command may be performed before the projector 200b receives the disconnection request from the computer 100b illustrated in step S527. In this case, the session information change notification is to be transmitted to each of the computers 100a and 100b.

Having received the session information change notification command in step S529, the computer 100a learns that the projector 200b has been deleted from the session. Then, the computer 100a determines that the state of the session does not match the projectors to which the computer 100a is currently connected, and the computer 100a performs a connection/disconnection process so that the projectors to which the computer 100a is currently connected match the session information received with the notification at this time. In this case, the computer 100b has deleted the projector 200b from the session. Thus, in step S531, the computer 100a disconnects the communication channel with the projector 200b. As a result, there is no computer to which the projector 200b is currently connected. Thus, the projector 200b enters the state before being sessionized, and clears all the session information held by the projector 200b.

Also in step S530, the computer 100a learns that the session information has been similarly changed. The computer 100a, however, performs a connection/disconnection process only if the computer 100a has detected that the projectors to which the computer 100a is currently connected do not match the projectors included in the session information. That is, the disconnection process in step S531 is triggered by the notification in step S529. Thus, even if the computer 100a has received a notification similar to that in step S530, the computer 100a does not need to perform the disconnection process again.

Further, the same situation as step S530 applies to step S528. Even if the computer 100b has received the session information change notification, the communication channel with the projector 200b has already been disconnected. Thus, the information regarding the projectors included in the new session information already matches the projectors to which the computer 100b is currently connected. That is, the computer 100b does not need to perform the process of disconnecting from the projector 200b again.

By the above process, the process of deleting the projector 200b from the session as the session change process has been completed. That is, the communication channels between the projector 200b and the computers 100a and 100b have been disconnected, and the projector 200b has returned to the state before being sessionized.

The session change process has been described taking as an example the sequence where a projector has been deleted. Alternatively, the addition of a projector and the simultaneous addition and deletion of projectors can also be achieved by the combination of the sequence described in the creation of a session and the sequence described here.

<Image Transmission>

The characteristic configuration of the present exemplary embodiment is described.

In the image processing system according to the present exemplary embodiment, each computer 100 transmits to each projector 200 an image to be projected by the projector 200 via a communication channel established by the above procedure, and the projector 200 displays the image. The image to be displayed by the projector 200 is, for example, an image corresponding to the entire area of a display screen displayed on the display unit 106 of each computer 100. Alternatively, if the computer 100 employs an operating system that uses a window system, the image may be an image in a window corresponding to a particular application. Yet alternatively, the image may be an image of an area specified in a screen transfer application for transmitting an image, which is being executed by the computer 100.

In response to the projection method selected by the user, the computer 100 according to the present exemplary embodiment switches communication methods to be used to transmit an image. Specifically, if a first projection method has been selected, the computer 100 transmits an image to each projector by a unicast communication method, using TCP/IP as a communication protocol. If, on the other hand, a second projection method has been selected, the computer 100 transmits an image to each projector by a multicast communication method, using UDP/IP as a communication protocol. The first projection method is a projection method where the computer 100 transmits an image to a single projector 200 or transmits images to a plurality of projectors 200. The second projection method is a projection method where the computer 100 transmits the same image to a plurality of projectors 200. In the second projection method, the computer 100 can also transmit an image to a single projector 200. The second projection method is termed a mirror mode or a multi-mode. Another projection method may be further included.

Further, in response to the switching of communication methods, the computer 100 differentiates the configuration of an image to be transmitted to the projector 200. Specifically, if the first projection method has been selected and an image is to be transmitted by the unicast communication method, the computer 100 transmits an image of, in the entire area of an image to be displayed by the projector 200, a partial area including a changed area and information (coordinates) indicating the position of the image of the partial area. Based on the received information indicating the position, the projector 200 combines the received image of the partial area with an image corresponding to the image that is being displayed, and the projector 200 displays the resulting composite image. Further, if the second projection method has been selected and an image is to be transmitted by the multicast communication method, the computer 100 transmits at predetermined intervals (3 seconds/4 seconds/5 seconds/optional) an image of the entire area of an image to be displayed by the projector 200. If having received the image of the entire area, the projector 200 displays the received image. Further, if the image to be displayed by the projector 200 has changed during the predetermined intervals, the computer 100 transmits an image of, in the entire area of the image to be displayed, a partial area including the changed area and information (coordinates) indicating the position of the image of the partial area. If having received the image of the partial area and the information, then based on the received information indicating the position, the projector 200 combines the received image of the partial area with an image corresponding to the image that is being displayed, and the projector 200 displays the resulting composite image.

If an image is thus transmitted by the multicast communication method, using UDP/IP as a communication protocol, an image of the entire area of an image to be displayed by the projector 200 is periodically transmitted. The reason for this is as follows. In UDP/IP, the communication protocol does not require the receiving end to respond to a command from the transmission source. Thus, if having transmitted an image, the computer 100 cannot determine whether or not the projector 200 has correctly received the image. That is, in the method of transmitting an image of a partial area including a changed area, if a data packet has been lost in the projector 200, the projector 200 has not been able to receive the image. Thus, the projector 200 cannot display the same image as that of the display screen of the computer 100. In response, in the image processing system according to the present exemplary embodiment, if the second projection method has been selected and an image is to be transmitted by the multicast communication method using UDP/IP, the computer 100 periodically transmits an image of the entire area of an image to be displayed by the projector 200. In TCP/IP, on the other hand, the communication protocol requires the receiving end to respond to a command from the transmission source. Thus, if having transmitted an image, the computer 100 can determine whether or not the projector 200 has correctly received the image. In response, in the image processing system according to the present exemplary embodiment, if the first projection method has been selected and an image is to be transmitted by the unicast communication method using TCP/IP, the computer 100 does not periodically transmit an image of the entire area of an image to be displayed by the projector 200. In the image processing system according to the present exemplary embodiment, the method of transmitting an image is thus changed according to the communication method. This can reduce the possibility of giving discomfort to the user.

A specific description is given below of the operation of the image processing system according to the present exemplary embodiment when the projector 200 displays an image transmitted from the computer 100.

First, a description is given of the operation of the image processing system according to the present exemplary embodiment when the first projection method has been selected, that is, when an image is to be transmitted to each projector by the unicast communication method, using TCP/IP as a communication protocol. FIG. 6 is a flow chart illustrating the operations performed when the computer 100 and the projector 200 display images. In FIG. 6, the flows illustrate the operation performed by the CPU 101 of the computer 100 controlling each block of the computer 100 and the operation performed by the CPU 201 of the projector 200 controlling each block of the projector 200.

First, in step S601, the CPU 101 of the computer 100 acquires from the RAM 102 or the VRAM 103 an "entire area image" of an image to be displayed by the projector 200 according to the screen transfer application loaded in the RAM 102. As described above, the image to be displayed by the projector 200 is, for example, an image corresponding to the entire area of a display screen displayed on the display unit 106 of each computer 100. Alternatively, if the computer 100 employs an operating system that uses a window system, the image may be an image in a window corresponding to a particular application. Yet alternatively, the image may be an image of an area specified in the screen transfer application for transmitting an image, which is being executed by the computer 100.

Next, in step S602, the CPU 101 of the computer 100 controls the communication unit 109 to transmit the "entire area image" to the projector 200. Under the control of the CPU 101, the communication unit 109 transmits the "entire area image" to the projector 200 via the network using TCP/IP as a communication protocol. At this time, the computer 100 transmits the "entire area image" onto the network such that the IP address of the computer 100 is the transmission source address and the IP address of the projector 200 is the transmission destination address. The CPU 101 may compress the acquired "entire area image" into the JPEG format before transmitting the "entire area image".

Next, if the computer 100 has not received a "reception response" before a predetermined time has elapsed since the computer 100 has transmitted the "entire area image" to the projector 200 (No in step S603), the CPU 101 performs the process of step S602 again. If the computer 100 has received a "reception response" (Yes in step S603), the processing proceeds to step S621.

Meanwhile, in step S611, the CPU 201 of the projector 200 is controlling each block of the projector 200 to be in a standby state until the projector 200 receives an "entire area image" from the computer 100. Then, if the communication unit 209 has received an "entire area image" (Yes in step S611), the processing proceeds to step S612.

If the communication unit 209 has received an "entire area image" (Yes in step S611), then in step S612, the CPU 201 controls the communication unit 209 to transmit to the computer 100 via the network a "reception response" indicating that the projector 200 has received data transmitted from the computer 100. At this time, the projector 200 transmits the "reception response" to the network such that the IP address of the projector 200 is the transmission source address and the IP address of the computer 100 is the transmission destination address.

Next, in step S613, the CPU 201 loads the received "entire area image" into the RAM 202. Then, the CPU 201 performs necessary image processing such as size conversion and image processing on the "entire area image" and stores the resulting image in the VRAM 204. Then, the CPU 201 controls the projection control unit 207 to cause the projection unit 206 to project the image stored in the VRAM 204. If the received "entire area image" is image data compressed in the JPEG format, the CPU 201 controls the decoder 205 to decode the received image data. Then, the CPU 201 loads the obtained image data into the RAM 202 and performs necessary image processing such as size conversion and image processing on the image data. At this time, the CPU 201 controls the RAM 202 to hold the image before being stored in the VRAM 204.

The "entire area image" transmitted from the computer 100 is thus projected by the projector 200. Next, a description is given of the processing performed when the image to be displayed by the projector 200 has changed.

Next, in step S621, the CPU 101 of the computer 100 determines whether or not the image to be displayed by the projector 200 has changed.

If it is determined that the image to be displayed by the projector 200 has changed (Yes in step S621), then in step S622, the CPU 101 of the computer 100 acquires an image of a partial area (an area smaller than the entire area) including the changed area. For example, if the entire area of the image to be displayed by the projector 200 is divided into twelve areas (3 vertical×4 horizontal areas), the CPU 101 acquires an image of a divided area including the changed area. The CPU 101 may acquire images of a plurality of divided areas. In the above description, the entire area is divided into twelve areas. Alternatively, the entire area may be divided into more areas or may be divided into fewer areas. The CPU 101 may acquire an image of a partial area (an area smaller than the entire area) at least including the changed area. Further, at this time, the CPU 101 also acquires information of the position (coordinates) of the acquired "partial area image". The position may be indicated by position information in any form that allows the identification of, for example, a position in the "entire area image" where the "partial area image" is located at. In the present exemplary embodiment, for example, the CPU 101 acquires information indicating the upper-left coordinates of the acquired "partial area image". Alternatively, the CPU 101 may acquire information indicating the position of the "partial area image" relative to the "entire area image".

Next, in step S623, the CPU 101 of the computer 100 controls the communication unit 109 to transmit the "partial area image" and the information indicating the position of the "partial area image" to the projector 200. Under the control of the CPU 101, the communication unit 109 transmits the "partial area image" and the information indicating the position of the "partial area image" to the projector 200 via the network using TCP/IP as a communication protocol. At this time, the computer 100 transmits the "partial area image" and the information indicating the position of the "partial area image" to the network such that the IP address of the computer 100 is the transmission source address and the IP address of the projector 200 is the transmission destination address. The CPU 101 may compress the acquired "partial area image" in the JPEG format before transmitting the "partial area image".

Next, if the computer 100 has not received a "reception response" before a predetermined time has elapsed since the computer 100 has transmitted the "partial area image" and the information indicating the position of the "partial area image" to the projector 200 (No in step S624), the CPU 101 performs the process of step S623 again. If the computer 100 has received a "reception response" (Yes in step S624), the processing proceeds to step S641.

Meanwhile, in step S631, the CPU 201 of the projector 200 is controlling the communication unit 209 of the projector 200 to be in the standby state until the projector 200 receives a "partial area image" and the information indicating the position of the "partial area image" from the computer 100. Until the projector 200 receives a new image, the CPU 201 is controlling the projection control unit 207 to cause the projection unit 206 to project the image stored in the VRAM 204. Then, if the communication unit 209 has received a "partial area image" and the information indicating the position of the "partial area image" (Yes in step S631), the processing proceeds to step S632.

If the communication unit 209 has received a "partial area image" and the information indicating the position of the "partial area image" (Yes in step S631), then in step S632, the CPU 201 controls the communication unit 209 to transmit to the computer 100 via the network a "reception response" indicating that the projector 200 has received data transmitted from the computer 100. At this time, the projector 200 transmits the "reception response" to the network such that the IP address of the projector 200 is the transmission source address and the IP address of the computer 100 is the transmission destination address.

Next, in step S633, the CPU 201 loads the received "partial area image" into the RAM 202. Then, the CPU 201 performs necessary image processing such as size conversion and image processing on the "partial area image" and performs the process of combining the resulting image with the image stored in the RAM 202 and corresponding to the currently projected image (an image equivalent to the image stored in the VRAM 204). Specifically, based on the information indicating the position of the "partial area image" received together with the "partial area image", the CPU 201 combines the "partial area image" with the image stored in the RAM 202 and corresponding to the currently projected image. That is, the CPU 201 of the projector 200 combines the "partial area image" received from the computer 100 with the image stored in the RAM 202, and thereby can generate an image by updating an image at the position where the change has occurred in the computer 100. Next, the CPU 201 stores the resulting composite image in the VRAM 204 and controls the projection control unit 207 to cause the projection unit 206 to project the image stored in the VRAM 204. If the received "partial area image" is image data compressed in the JPEG format, the CPU 201 controls the decoder 205 to decode the received image data. Then, the CPU 201 loads the obtained image data into the RAM 202 and performs necessary image processing such as size conversion and image processing on the image data. At this time, the CPU 201 controls the RAM 202 to hold the image before being stored in the VRAM 204.

The image thus projected by the projector 200 based on the "partial area image" and the information indicating the position of the "partial area image" transmitted from the computer 100 is an image obtained by updating an image at the position where the change has occurred. This operation is repeated until an end instruction is given. This enables the projector 200 to update and display an image having changed in the computer 100. Next, the procedure until the end of the projection is described.

Next, in step S641, the CPU 101 of the computer 100 determines whether or not an instruction to end the projection has been input through the operation unit 108. If an instruction to end the projection has not been input (No in step S641), the processing returns to step S621.

If an instruction to end the projection has been input (Yes in step S641), then in step S642, the CPU 101 of the computer 100 controls the communication unit 109 to transmit an "end instruction" to the projector 200. Under the control of the CPU 101, the communication unit 109 transmits an "end instruction" to the projector 200 via the network using TCP/IP as a communication protocol. At this time, the computer 100 transmits the "end instruction" to the network such that the IP address of the computer 100 is the transmission source address and the IP address of the projector 200 is the transmission destination address.

Next, if the computer 100 has not received a "reception response" before a predetermined time has elapsed since the computer 100 has transmitted the "end instruction" to the projector 200 (No in step S643), the CPU 101 performs the process of step S642 again. If the computer 100 has received a "reception response" (Yes in step S643), the CPU 101 ends this processing.

Meanwhile, in step S651, if the projector 200 has received an "end instruction" from the computer 100 (Yes in step S651), the processing proceeds to step S652.

If the communication unit 209 has received an "end instruction" (Yes in step S651), then in step S652, the CPU 201 controls the communication unit 209 to transmit to the computer 100 via the network a "reception response" indicating that the projector 200 has received data transmitted from the computer 100. At this time, the projector 200 transmits the "reception response" to the network such that the IP address of the projector 200 is the transmission source address and the IP address of the computer 100 is the transmission destination address.

Next, in step S653, the CPU 201 controls the projection control unit 207 to end the projection, and causes each block of the projector 200 to transition to the standby state.

As described above, if an image is to be transmitted to each projector by the unicast communication method using TCP/IP as a communication protocol, the computer 100 transmits an image of a partial area without periodically transmitting an image of the entire area.

Next, a description is given of the operation of the image processing system according to the present exemplary embodiment when the second projection method has been selected, that is, when an image is to be transmitted to each projector by the multicast communication method, using UDP/IP as a communication protocol. FIG. 7 is a flow chart illustrating the operations performed when the computer 100 and the projector 200 display images. In FIG. 7, the flows illustrate the operation performed by the CPU 101 of the computer 100 controlling each block of the computer 100 and the operation performed by the CPU 201 of the projector 200 controlling each block of the projector 200.

If the second projection method has been selected, that is, if an image is to be transmitted to each projector by the multicast communication method, using UDP/IP as a communication protocol, then before the communication is started, a "common address" is set for projectors 200 selected by the computer 100 and to be used. The "common address" is used as follows. If data is transmitted to the "common address" as the transmission destination by the multicast communication method, all devices for which the "common address" is set can receive the data. The "common address" may be set by a manual input of the user, or may be a predetermined address determined in advance. The "common address" is, for example, an "IP multicast group address".

First, in step S701, the CPU 101 of the computer 100 acquires from the RAM 102 or the VRAM 103 an "entire area image" of an image to be displayed by the projector 200 according to the screen transfer application loaded in the RAM 102. As described above, the image to be displayed by the projector 200 is, for example, an image corresponding to the entire area of a display screen displayed on the display unit 106 of each computer 100. Alternatively, if the computer 100 employs an operating system that uses a window system, the image may be an image in a window corresponding to a particular application. Yet alternatively, the image may be an image of an area specified in the screen transfer application for transmitting an image, which is being executed by the computer 100.

Next, in step S702, the CPU 101 of the computer 100 controls the communication unit 109 to transmit the "entire area image" to the projector 200. Under the control of the CPU 101, the communication unit 109 transmits the "entire area image" to the projector 200 via the network using UDP/IP as a communication protocol. At this time, the computer 100 transmits the "entire area image" onto the network such that the IP address of the computer 100 is the transmission source address and a predetermined "common address" is the transmission destination address. The CPU 101 may compress the acquired "entire area image" into the JPEG format before transmitting the "entire area image". Data is transmitted to the "common address", and therefore, as well as the projector 200, a projector to which the currently used "common address" is assigned can receive the "entire area image". The CPU 101 does not wait for a "reception response" from the projector 200, and the processing proceeds to the next step.

Next, in step S703, the CPU 101 of the computer 100 determines whether or not a predetermined time has elapsed since the computer 100 has transmitted the "entire area image". The predetermined time may be a fixed time (e.g., 3 seconds) set in advance, or may be any time set by the user. If the CPU 101 has determined that the predetermined time has elapsed (Yes in step S703), the processing returns to step S701. If the CPU 101 has determined that the predetermined time has not elapsed (No in step S703), the processing proceeds to step S721.

Next, in step S721, the CPU 101 of the computer 100 determines whether or not the image to be displayed by the projector 200 has changed. If the image has not changed (No in step S721), the processing returns to step S703. If the image has changed (Yes in step S721), the processing proceeds to step S722.

If it is determined that the image to be displayed by the projector 200 has changed (Yes in step S721), then in step S722, the CPU 101 of the computer 100 acquires an image of a partial area (an area smaller than the entire area) including the changed area. For example, if the entire area of the image to be displayed by the projector 200 is divided into twelve areas (3 vertical×4 horizontal areas), the CPU 101 acquires an image of a divided area including the changed area. The CPU 101 may acquire images of a plurality of divided areas. In the above description, the entire area is divided into twelve areas. Alternatively, the entire area may be divided into more areas or may be divided into fewer areas. The CPU 101 may acquire an image of a partial area (an area smaller than the entire area) at least including the changed area. Further, at this time, the CPU 101 also acquires information of the position (coordinates) of the acquired "partial area image". The position may be indicated by position information in any form that allows the identification of, for example, a position in the "entire area image" where the "partial area image" is located at. In the present exemplary embodiment, for example, the CPU 101 acquires information indicating the upper-left coordinates of the acquired "partial area image". Alternatively, the CPU 101 may acquire information indicating the position of the "partial area image" relative to the "entire area image".

Next, in step S723, the CPU 101 of the computer 100 controls the communication unit 109 to transmit the "partial area image" and the information indicating the position of the "partial area image" to the projector 200. Under the control of the CPU 101, the communication unit 109 transmits the "partial area image" and the information indicating the position of the "partial area image" to the projector 200 via the network using UDP/IP as a communication protocol. At this time, the computer 100 transmits the "partial area image" and the information indicating the position of the "partial area image" to the network such that the IP address of the computer 100 is the transmission source address and the predetermined "common address" is the transmission destination address. The CPU 101 may compress the acquired "partial area image" in the JPEG format before transmitting the "partial area image". Data is transmitted to the "common address", and therefore, as well as the projector 200, a projector to which the currently used "common address" is assigned can receive the "partial area image". The CPU 101 does not wait for a "reception response" from the projector 200, and the processing proceeds to the next step.

Meanwhile, in step S731, the CPU 201 of the projector 200 determines whether or not the projector 200 has received an image from the computer 100. The image to be received is the "entire area image" transmitted from the computer 100 to the "common address" in step S702, or the "partial area image" transmitted from the computer 100 to the "common address" in step S723. Until the projector 200 receives a new image, the CPU 201 is controlling the projection control unit 207 to cause the projection unit 206 to project the image stored in the VRAM 204.

Next, if it is determined that the projector 200 has received an image from the computer 100 (Yes in step S731), then in step S732, the CPU 201 controls the projection control unit 207 to cause the projection unit 206 to project an image corresponding to the received image. If an "entire area image" has been received, the CPU 201 loads the received "entire area image" into the RAM 202. Then, the CPU 201 performs necessary image processing such as size conversion and image processing on the "entire area image" and stores the resulting image in the VRAM 204. Then, the CPU 201 controls the projection control unit 207 to cause the projection unit 206 to project the image stored in the VRAM 204. If the received "entire area image" is image data compressed in the JPEG format, the CPU 201 controls the decoder 205 to decode the received image data. Then, the CPU 201 loads the obtained image data into the RAM 202 and performs necessary image processing such as size conversion and image processing on the image data. At this time, the CPU 201 controls the RAM 202 to hold the image before being stored in the VRAM 204. If a "partial area image" has been received, the CPU 201 loads the received "partial area image" into the RAM 202. Then, the CPU 201 performs necessary image processing such as size conversion and image processing on the "partial area image" and performs the process of combining the resulting image with the image stored in the RAM 202 and corresponding to the currently projected image (an image equivalent to the image stored in the VRAM 204). Specifically, based on the information indicating the position of the "partial area image" received together with the "partial area image", the CPU 201 combines the "partial area image" with the image stored in the RAM 202 and corresponding to the currently projected image. That is, the CPU 201 of the projector 200 combines the "partial area image" received from the computer 100 with the image stored in the RAM 202, and thereby can generate an updated image at the position where the change has occurred in the computer 100. Next, the CPU 201 stores the resulting composite image in the VRAM 204 and controls the projection control unit 207 to cause the projection unit 206 to project the image stored in the VRAM 204. If the received "partial area image" is image data compressed in the JPEG format, the CPU 201 controls the decoder 205 to decode the received image data. Then, the CPU 201 loads the obtained image data into the RAM 202 and performs necessary image processing such as size conversion and image processing on the image data. The CPU 201 controls the RAM 202 to hold the image before being stored in the VRAM 204.

Based on the "entire area image" or the "partial area image" transmitted from the computer 100, the image processing system according to the present exemplary embodiment can thus project an image.

The operation of ending the projection is similar to the processes of steps S641 to S653 described above, and therefore, the corresponding steps are designated by the same numerals in FIG. 7 and not described here.

As described above, when transmitting an image to each projector by the multicast communication method, using UDP/IP as a communication protocol, the computer 100 periodically transmits an image of the entire area. Then, while an image of the entire area is transmitted at regular intervals, if the image to be displayed on each projector has changed during the intervals, the computer 100 transmits an image of a partial area including the changed area.

As described above, in the image processing system according to the present exemplary embodiment, according to the communication protocol to be used to transmit an image from the computer 100, the computer 100 periodically switches whether or not to acquire and transmit an "entire area image". That is, as in TCP/IP, in a communication protocol that requires the receiving end to respond, the computer 100 transmits a "partial area image" including a changed area without periodically transmitting an "entire area image". In other words, as in TCP/IP, in a communication protocol that guarantees the reliability, the ordering, and the data integrity of data transfer, the computer 100 transmits a "partial area image" including a changed area without periodically transmitting an "entire area image". On the other hand, as in UDP/IP, in a communication protocol that does not require the receiving end to respond, the computer 100 periodically transmits an "entire area image". Then, if a change has occurred during the intervals between the transmissions of an "entire area image", the computer 100 transmits a "partial area image" including the changed area. In other words, in multicast communication using UDP/IP, which does not guarantee the reliability, the ordering, and the data integrity of data transfer, the computer 100 periodically transmits an "entire area image" so that it is possible to recover data even if data has been missing or data has been garbled. Thus, it is possible to make effective use of a communication band according to the communication protocol, and also reduce the possibility of giving discomfort to the user in the image processing system.

In the present exemplary embodiment, a description has been given on the assumption that a communication method is determined according to the projection method. In other words, whether or not to periodically transmit an "entire area image" is switched according to the projection method. Alternatively, the user may be allowed to operate the computer 100 to select a communication method instead of a projection method.

Further, in the present exemplary embodiment, a description has been given on the assumption that a communication method and a projection method are selected in advance. Alternatively, communication methods may be switched according to the number of projectors to display images. For example, if a plurality of projectors display images (that is, if a plurality of projectors are the image transmission destinations), the computer 100 transmits an image to each projector by the multicast communication method, using UDP/IP as a communication protocol. If, on the other hand, a single projector projects an image (that is, a single projector is the image transmission destination), the computer 100 transmits an image to the projector by the unicast communication method, using TCP/IP as a communication protocol. Similarly to the present exemplary embodiment, in the case of the multicast communication method, the computer 100 periodically transmits an "entire area image", and in the case of the unicast communication method, the computer 100 transmits a "partial area image" without periodically transmitting an "entire area image". It may be determined whether each projector is on the same local network as that of the computer 100, depending on whether the network address of the projector is the same as the subnet mask of the computer 100.

Further, a description has been given on the assumption that a communication method and a projection method are selected in advance. Alternatively, communication methods may be switched according to whether or not a projector that is the transmission destination is on the same local network as that of the computer 100 that is the transmission source. In this case, when transmitting images to projectors on the same local network, the computer 100 transmits an image to each projector by the multicast communication method, using UDP/IP as a communication protocol. When, on the other hand, transmitting images to projectors that are not on the same local network, the computer 100 transmits an image to each projector by the unicast communication method, using TCP/IP as a communication protocol. Similarly to the present exemplary embodiment, in the case of the multicast communication method, the computer 100 periodically transmits an "entire area image", and in the case of the unicast communication method, the computer 100 transmits a "partial area image" without periodically transmitting an "entire area image". It may be determined whether each projector is on the same local network as that of the computer 100, depending on whether the subnet mask of the projector is the same as the subnet mask of the computer 100.

Alternatively, a third projection method different from the first and second projection methods may be employed. In the third projection method, the computer 100 transmits an image to each projector by the unicast communication method, using TCP/IP as a communication protocol, but periodically acquires and transmits an "entire area image". That is, also in the unicast method, the computer 100 may have another mode where the computer 100 periodically acquires and transmits an "entire area image". Then, if an "entire area image" is periodically transmitted as in the second and/or third projection methods according to the present exemplary embodiment, it may be possible that the greater the number of projectors to project images, the shorter the intervals between the transmission of an "entire area image". On the other hand, it may also be possible that the smaller the number of projectors to project images, the longer the intervals between the transmissions of an "entire area image". That is, the image processing system according to the present exemplary embodiment may have a mode where an "entire area image" is transmitted at intervals longer than predetermined intervals, and a mode where an "entire area image" is transmitted at intervals shorter than the predetermined intervals. Alternatively, as an exceptional process, an "entire area image" may be periodically transmitted, but if, during the intervals between the transmission of an "entire area image", the image to be displayed by a projector has changed in a predetermined number or more of divided areas (e.g., ten or more areas among twelve areas), a next "entire area image" may not be acquired and transmitted. This is because when the changed areas have been transferred, an image almost similar to the "entire area image" has been transmitted, and therefore, it is not necessary to transmit the "entire area image".

Further, in a mode where an "entire area image" is periodically transmitted, if an image is compressed in, for example, the JPEG format and transmitted, the following process may be performed. When transmitting an "entire area image" or a "partial area image", the CPU 101 compresses the image to be transmitted in the JPEG format. At this time, in the JPEG image compression, as is known, a quantization coefficient Q is set. In the image processing system according to the present exemplary embodiment, a change in the quantization coefficient Q is prohibited between the transmission of a first "entire area image" and the transmission of a next "entire area image". That is, when a "partial area image" is compressed in the JPEG format, the "partial area image" is quantized in the JPEG compression using the same quantization coefficient Q as the quantization coefficient Q used immediately before at the time the "entire area image" is transmitted. When, on the other hand, the next "entire area image" is compressed in the JPEG format, the next "entire area image" is quantized in the JPEG compression using a quantization coefficient Q different from the quantization coefficient Q used when the first "entire area image" has been transmitted. This can make an appropriate amount of image data and also prevent the composite display of images quantized using different quantization coefficients Q. This can reduce the user's discomfort. Further, also when an image is corrected before being compressed in the JPEG format, similarly, changes in the correction parameters may be prohibited between the transmission of a first "entire area image" and the transmission of a next "entire area image". For example, changes in the intensity and the cutoff frequency of a low-pass filter for reducing the high-frequency component of an image may be prohibited between the transmission of a first "entire area image" and the transmission of a next "entire area image". Further, if an image displayed on the display unit 106 of the computer 100 is an image having a 10-bit gray scale for each color, it is necessary to convert (perform gray scale conversion/tone mapping on) the image into an image having an 8-bit gray scale before compressing the image into the JPEG format. Thus, a change in the method of gray scale conversion/tone mapping may be prohibited between the transmission of a first "entire area image" and the transmission of a next "entire area image".

In the present exemplary embodiment, a description has been given of an image processing system including a computer and a projector. However, an apparatus for transmitting an image is not limited to a computer, and an apparatus for displaying an image is not limited to a projector. For example, an apparatus for transmitting an image may be, for example, a mobile phone, a tablet computer, a hard disk recorder, or a digital camera. Further, an apparatus for displaying an image may be a display, a television, a mobile phone, or a tablet computer.

<Other Exemplary Embodiments>

The present disclosure is achieved also by performing the following process. Software (a program) for achieving the functions of the above exemplary embodiment may be supplied to a system or an apparatus via a network or various storage media to cause a computer (or a CPU or a micro processing unit (MPU)) of the system or the apparatus to read and execute the program.

Other Embodiments

Embodiments of the present disclosure can also be realized by a computer of a system or apparatus that reads out and executes computer executable instructions recorded on a storage medium (e.g., a non-transitory computer-readable storage medium) to perform the functions of one or more of the above-described embodiment(s) of the present disclosure, and by a method performed by the computer of the system or apparatus by, for example, reading out and executing the computer executable instructions from the storage medium to perform the functions of one or more of the above-described embodiment(s). The computer may comprise one or more of a CPU, MPU, or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2013-114508 filed May 30, 2013, which is hereby incorporated by reference herein in its entirety.

What is claimed is:

1. An image processing apparatus capable of communicating with a projection apparatus, the image processing apparatus comprising at least one processor coupled to at least one memory, the at least one processor being programmed for:

controlling display on a display device connected to the image processing apparatus;

detecting a change in an image to be displayed on the display device;

controlling to transmit a partial area of an entire area of the image to be displayed, if the detecting detects the change in the image, the partial area including the detected change of the image and not being the entire area of the image;

controlling to transmit the entire area at predetermined intervals and transmit the partial area at timing other than the predetermined intervals, if a method of transmitting the image to the projection apparatus is a first communication method where a reception response is not made to transmission of the image; and controlling to transmit the partial area and not transmit the entire area at the predetermined intervals, if the detecting detects the change in the partial area of the image, the partial area not being the entire area of the image, if the method of transmitting the image to the projection apparatus is a second communication method where a reception response is made to transmission of the image.

2. The image processing apparatus according to claim 1, wherein the first communication method is multicast, and the second communication method is unicast.

3. The image processing apparatus according to claim 1, wherein the method of transmitting an image to the projection apparatus is determined based on an output setting of the projection apparatus.

4. The image processing apparatus according to claim 1, wherein the first communication method is used in a mode where the image processing apparatus communicates with a single projection apparatus.

5. The image processing apparatus according to claim 1, wherein the image processing apparatus is capable of communicating with a plurality of projection apparatuses, the first communication method allows a different image to be transmitted to each of the plurality of projection apparatuses, and the second communication method allows the same image to be transmitted to the plurality of projection apparatuses.

6. The image processing apparatus according to claim 1, wherein the at least one processor is further programmed for, if the image is transmitted by the first communication method, specifying an address of the projection apparatus as a transmission destination of the image.

7. The image processing apparatus according to claim 6, wherein if the image is transmitted by the second communication method, the at least one processor is further programmed for specifying an address different from the address of the projection apparatus as a transmission destination of the image.

8. An image processing apparatus capable of communicating with a projection apparatus, the image processing apparatus comprising at least one processor coupled to at least one memory, the at least one processor being programmed for:

controlling display on a display device connected to the image processing apparatus;

detecting a change in an image to be displayed on the display device;

controlling to transmit a partial area of an entire area of the image to be displayed, if the detecting detects the change in the image, the partial area including the detected change of the image and not being the entire area of the image;

controlling to transmit the entire area of the image to be displayed, if a method of transmitting an image to the projection apparatus is a first communication method; and controlling to transmit the partial area and not transmit the entire area at predetermined intervals, if the detecting detects the change in the partial area of the image, the partial area not being the entire area of the image, if a method of transmitting an image to the projection apparatus is a second communication method, wherein transmission of the partial area and/or the entire area is controlled based on whether a reception response is made to transmission of the image.

9. The image processing apparatus according to claim 8, wherein the first communication method is multicast, and the second communication method is unicast.

10. The image processing apparatus according to claim 8, wherein the method of transmitting an image to the projection apparatus is determined based on an output setting of the projection apparatus.

11. The image processing apparatus according to claim 8, wherein the first communication method is used in a mode where the image processing apparatus communicates with a single projection apparatus.

12. The image processing apparatus according to claim 8, wherein the image processing apparatus is capable of communicating with a plurality of projection apparatuses, the first communication method allows a different image to be transmitted to each of the plurality of projection apparatuses, and the second communication method allows the same image to be transmitted to the plurality of projection apparatuses.

13. The image processing apparatus according to claim 8, wherein the at least one processor is further programmed for, if the image is transmitted by the first communication method, specifying an address of the projection apparatus as a transmission destination of the image.

14. The image processing apparatus according to claim 8, wherein if the image is transmitted by the second communication method, the at least one processor is further programmed for specifying an address different from the address of the projection apparatus as a transmission destination of the image.

15. A method of controlling an image processing apparatus capable of communicating with a projection apparatus, the method comprising:

controlling display on a display device connected to the image processing apparatus;

detecting a change in an image to be displayed on the display device;

controlling to transmit a partial area of an entire area of the image to be displayed, if the detecting detects the change in the image, the partial area including the detected change of the image and not being the entire area of the image;

controlling to transmit the entire area at predetermined intervals and transmit the partial area at timing other than the predetermined intervals, if the method of transmitting the image to the projection apparatus is a first communication method where a reception response is not made to a transmission of the image; and controlling to transmit the partial area and not transmit the entire area at the predetermined intervals, if the detecting detects the change in the partial area of the image, the partial area not being the entire area of the image, if the method of transmitting the image to the projection apparatus is a second communication method where a reception response is made to transmission of the image.

16. A method of controlling an image processing apparatus capable of communicating with a projection apparatus, the method comprising:
controlling display on a display device connected to the image processing apparatus;
detecting a change in an image to be displayed on the display device;
controlling to transmit a partial area of an entire area of the image to be displayed, if the detecting detects the change in the image, the partial area including the detected change of the image and not being the entire area of the image;
controlling to transmit the entire area at predetermined intervals and transmit the partial area at timing other than the predetermined intervals, if a method of transmitting an image to the projection apparatus is a first communication method; and
controlling to transmit the partial area and not transmit the entire area at the predetermined intervals, if the method of transmitting the image to the projection apparatus is a second communication method,
wherein transmission of the partial area and/or the entire area is controlled based on whether a reception response is made to transmission of the image.

17. A non-transitory computer readable recording medium storing a program that causes a computer to function as an image processing apparatus capable of communicating with a projection apparatus, the image processing apparatus comprising at least one processor coupled to at least one memory, the at least one processor being programmed for:
controlling display on a display device connected to the image processing apparatus;
detecting a change in an image to be displayed on the display device;
controlling to transmit a partial area of an entire area of the image to be displayed, if the detecting detects the change in the image, the partial area including the detected change of the image and not being the entire area of the image;
controlling to transmit the entire area at predetermined intervals and transmit the partial area at timing other than the predetermined intervals, if the method of transmitting the image to the projection apparatus is a first communication method where a reception response is not made to a transmission of the image; and
controlling to transmit the partial area and not transmit the entire area at the predetermined intervals, if the detecting detects the change in the partial area of the image, the partial area not being the entire area of the image, if the method of transmitting the image to the projection apparatus is a second communication method where a reception response is made to transmission of the image.

18. A non-transitory computer readable recording medium storing a program that causes a computer to function as an image processing apparatus capable of communicating with a projection apparatus, the image processing apparatus comprising at least one processor coupled to at least one memory, the at least one processor being programmed for:
controlling display on a display device connected to the image processing apparatus;
detecting a change in an image to be displayed on the display device;
controlling to transmit a partial area of an entire area of the image to be displayed, if the detecting detects the change in the image, the partial area including the detected change of the image and not being the entire area of the image;
controlling to transmit the entire area at predetermined intervals and transmit the partial area at timing other than the predetermined intervals, if a method of transmitting an image to the projection apparatus is a first communication method; and
controlling to transmit the partial area and not transmit the entire area at the predetermined intervals, if the method of transmitting the image to the projection apparatus is a second communication method,
wherein transmission of the partial area and/or the entire area is controlled based on whether a reception response is made to transmission of the image.

* * * * *